April 21, 1959 H. RUBINSTEIN ET AL 2,883,648
MAGNETIC SHIFT REGISTERS
Filed Jan. 14, 1954 2 Sheets-Sheet 1

INVENTORS
HARVEY RUBINSTEIN
ROBERT C. KELNER
BY Joseph Weingarten
ATTORNEY

INVENTORS
HARVEY RUBINSTEIN
ROBERT C. KELNER
BY Joseph Weingarten
ATTORNEY

United States Patent Office 2,883,648

Patented Apr. 21, 1959

2,883,648

MAGNETIC SHIFT REGISTERS

Harvey Rubinstein, Somerville, and Robert C. Kelner, Concord, Mass., assignors to Laboratory For Electronics, Inc., Boston, Mass., a corporation of Delaware Application January 14, 1954, Serial No. 403,991

9 Claims. (Cl. 340—174)

The present invention relates in general to digital data processing and storage apparatus and more particularly concerns improvements in magnetic shift registers.

Broadly speaking, the magnetic shift register comprises a serial chain of bistable magnetic cores capable of accepting, storing and redelivering data pulses (or binary "bits") under the control of a pulsed timing signal called a shift current. In view of the virtually universal application of shift registers to digital computation and allied arts, numerous literature references are presently available which qualitatively and analytically describe the design philosophy of such circuits. It would thus appear unnecessary at this point to enter an extensive background discussion other than to note generally some of the major classifications of apparatus in this field.

In an early form, the magnetic shift register consisted of two rows of serially arranged magnetic cores which were alternately actuated from phase displaced pulse generators of equal periodicity. Data pulses were entered into the first core of one row, and in operation, each data pulse was successively transferred from row to row while serially shifting from core to core. As a practical matter, one core row served simply for temporary signal storage during the advance sequence, while the other row functioned as actual storage. Hence, two magnetic cores were necessary for the storage of each binary bit of information.

While this register configuration still offers specialized advantages in some data processing applications, there has since appeared a fundamental variation utilizing one core per bit, comprised of a single row of serially connected magnetic cores, all actuated simultaneously from a single shift pulse source. Temporary storage facilities are still necessary, but instead of utilizing a second core for the intermediate retention of binary information, a storage capacitor is employed in the transfer circuitry between magnetic cores.

In a cost analysis of shift registers, one finds that the primary limitation is the expense of winding magnetic cores. Considerations relating to magnetic efficiency dictate that the cores be toroidal in form and, as is well known, product uniformity may only be achieved here through the use of highly specialized, complex and costly toroidal coil winding machinery. For this reason, the single core per bit register has attained considerable popularity and equipment designers have substituted it for the two core arrangement wherever possible.

In the single core per bit magnetic shift registers hitherto available, at least three independent windings were found on each of the toroidal cores. As a result, for each binary bit of data storage available, the cost of the toroidal magnetic core generally exceeded the total cost of all other electrical components associated therewith. But wholly irrespective of cost, two other factors were adversely affected by the need for three independent windings per core; namely, reliability, which is an immediate function of the number of circuits in which component failure may occur, and core size, which is obviously related to the amount of copper wound thereon. In short, the single core per bit shift register, though less complex and less expensive than the two core per bit device, still was, to an extent, unsatisfactory from the point of view of cost, size and reliability.

The present invention contemplates and has as a primary object the improvement of single core per bit magnetic shift registers through the utilization of novel circuit techniques which absolutely minimize the number of windings necessary per core for effective and dependable shift register performance. In one broad aspect of the present invention, a plurality of serially connected, bistable magnetic cores, each having two windings thereon, are interconnected to provide shift register operation. In another aspect thereof, shift register performance is attained with but one winding per magnetic core. Further, through a novel extension of the latter concepts, conventional winding techniques may be wholly dispensed with, and a single conductor threaded through the serially arranged, unwound magnetic cores to achieve shift register performance with an absolute minimum of cost and weight, and with a degree of reliability heretofore unavailable.

It is, accordingly, an object of the present invention to minimize the number of components necessary to the storage of a binary bit of data in magnetic core shift registers without adversely affecting signal level or system power requirements.

A further object of the present invention is to avoid entirely, through novel design techniques, the need for toroidal coil winding apparatus in the manufacture of magnetic core shift registers.

These and other objects of the present invention will become apparent from the following detailed specification when taken in connection with the accompanying drawing in which.

Figure 1:
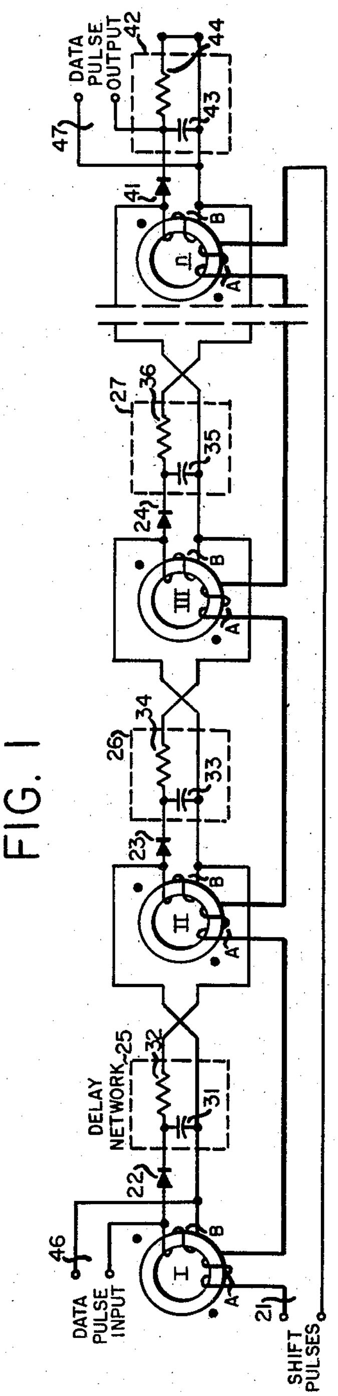
Fig. 1 is a schematic circuit diagram of a magnetic core shift register embodying the principles of the present invention.

With reference now to the drawing, and more particularly to Fig. 1 thereof, there is illustrated a magnetic core, binary data shift register capable of effectively retaining *n* bits of binary data in a corresponding number *n* of preferably identical, bistable toroidal magnetic cores, which have been designated on the drawing by the Roman numerals I, II, III, . . . *n*.

Prior to entering a comprehensive discussion of the design and performance characteristics of the circuit, however, it is considered appropriate to discuss the qualities and behavior of the individual toroidal cores embodied therein. The special properties of interest here are imparted to the toroidal cores by the nature of magnetic core material from which they are formed. This material is of comparatively modern origin and is available either in relatively thin ribbon form or in thermally set molded solid form, and exhibits the characteristic of having two readily distinguishable residual magnetic flux states where the flux magnitude in either condition is only slightly less than the saturation flux of that polarity. Materials commercially available under such trade names as Deltamax, Mo-Permalloy, and other substances, when suitably annealed at predetermined critical temperatures in the presence of external magnetic fields, display the desired properties.

Figure 2:
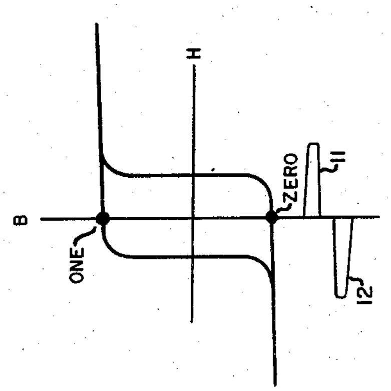
Fig. 2 is a graphical representation of the magnetization characteristics of magnetic components utilized in connection with this invention.

Fig. 2 depicts graphically the now well known rectangular hysteresis loop which characterizes such core material. Specifically, Fig. 2 is a plot of the magnetic flux density B as a function of the magnetizing force H for a particular core. It will be appreciated that this curve is also representative of the plot of proportional parameters; namely, total flux versus magnetizing ampere-turns.

Fig. 2 illustrates the phenomena that as the magnetizing force is increased positively, the flux density rises abruptly to substantially its positive saturation value, and that reversal of the magnetic field intensity beyond a predetermined value in the negative direction is accompanied by an equally abrupt reversal of the core flux density to substantial saturation in the negative direction. By virtue of the extensive application of cores of this type to digital computation equipment, the nomenclature conventions adopted have been derived from the binary system of notation, and for convenience, these conventions are embodied in Fig. 2, in that positive and negative residual flux states have been arbitrarily designated as the One condition and Zero condition, respectively. It should be observed that unless some special procedure is followed to demagnetize this core material after use, the core, by virtue of its bistable properties, will remain indefinitely in either the One or the Zero residual flux state.

In Fig. 2, two magnetizing pulses 11 and 12 are illustrated for the purpose of demonstrating the manner in which a core having the properties plotted may be placed in either the One or Zero state of residual magnetization. Observe that both pulses 11 and 12 are greater than the magnetizing force necessary to cause change in state in that direction. By further adopting accepted conventional magnetic notation, pulses 11 and 12, capable of setting the One and Zero states, are herein called, respectively, One and Zero pulses.

Assume that a magnetic core having the properties shown in Fig. 2 is placed in the One state by an appropriate One pulse. The application of a Zero pulse will result in a flux change approximately equal to twice the residual flux in either direction, and if a coil is linked with this flux change, a proportionate output pulse potential will be induced therein. If, on the other hand, a One pulse is applied to a core already in the One state, then the flux change will be only that small difference between the saturation flux and the residual flux. In a coil linked with this flux change, a relatively small amplitude potential will be induced; but since this potential lacks utility and is plainly distinguishable from that induced by a reversal in state, it will be completely disregarded in the discussion which follows.

With the magnetic properties of bistable toroidal cores in view, attention is again directed to the schematic circuit diagram, Fig. 1. It is seen that each of the toroidal cores I, II, III, . . . $n$ is arranged with two windings A and B to which the conventional dot notation has been applied as indicative of relative polarity, or winding direction. In the following discussion, the winding terminals are appropriately called "dotted" and "undotted."

All windings A are uniformly connected in series and energized from a shift pulse current source (not shown) at input terminals 21. The B winding of each core, with the exception of the $n^{th}$ or last, is coupled to the B winding of the next succeeding core through a rectifier element, such as a germanium or other crystal diode, and a delay network. These diodes have been denoted by reference numerals 22, 23 and 24, and the respective delay networks by numerals 25, 26 and 27. The delay networks have been illustrated in an elementary form, each comprised of a shunt capacitor and a series resistor 31—32, 33—34, 35—36, respectively. Of particular importance is the fact that at the output of each delay network, again with the exception of the last, the coupling leads are reversed before connection to the next B winding. In other words, current flowing out of the dotted terminal of the B winding on core I flows through rectifier 22, resistor 32 and enters the undotted terminal on the B winding of core II. This inversion is repeated, as shown in the drawing, between each of the cores in the shift register.

The B winding of core $n$ is coupled through diode 41 into a delay network 42, made up of capacitor 43 and resistor 44, as for those circuits associated with prior cores. The output of this last delay circuit is, however, short-circuited, as shown.

Data pulse signals are directly applied to the B winding of the first core in the shift register from input terminals 46. The system output, in serial pulse form, is derived at terminals 47 across capacitor 43 following the $n^{th}$ and final core of the shift register.

Before discussing the operation of the shift register of Fig. 1, it would be well to apply the arbitrary system of notation developed earlier in connection with Fig. 2. Let it be considered that a current pulse flowing into the dotted terminal of a winding is such as to set the magnetic state of that core, to Zero, and that all shift pulses applied at terminal 21 are such Zero pulses. A current pulse flowing into the undotted terminal of a winding will thus set the core to the magnetic One state.

As is standard practice, a train of substantially uniform relatively short duration shift pulses are applied at terminal 21. These pulses may be periodic or aperiodic, depending on application. Each shift pulse will set all cores in the register to the Zero state. Assume now that in an interval between shift pulses, a One pulse is applied at terminals 46 to set core I to the One magnetic state. From the earlier discussion on the convention herein adopted, this is accomplished by applying a pulse at terminals 46 which causes current to flow into the undotted terminal of the B winding of core I; that is, a pulse which is negative at the dotted terminal with respect to the undotted end of that winding. It will be immediately observed that since the dotted terminal is relatively negative, rectifier 22 precludes current flow in the direction of core II of the shift register, whereby the sole effect of the One pulse applied at terminals 46 is to set core I to the One state.

Upon the application of the next sequential shift pulse at terminal 21, all cores will again be set to Zero and the residual flux in core I will abruptly be reversed from the One to the Zero state, with the result that a pulse will be induced in the B winding of the first core in such direction as to cause current to flow out of the dotted terminal, through rectifier 22 and into capacitor 31. In short, the effect of resetting core I to the Zero state is to positively charge capacitor 31. The low impedance of capacitor 31 relative to the circuit to its immediate right, including series resistor 32, will effectively preclude substantial current flow into the circuits of the following cores; that is, what current does flow in that direction will not be operative to alter the state of a magnetic core.

Prior to the next shift pulse, capacitor 31 will discharge through resistor 32 into winding B associated with core II. With the reversal of leads as shown, current will flow into the undotted terminal of the B winding of core II, and this, as noted above, will set core II to the One state. At this point in time, then core I will be in the Zero state, core II in the One state, and the following cores all in the Zero state. Plainly, the magnitude of resistor 32 must be such as to permit a current, on discharge of capacitor 31, sufficient to reverse the core state.

If no further data pulses were applied, the next shift pulse would be effective to reverse the residual flux in core II which, in a manner similar to that described in connection with core I, will produce an output pulse which, through delay network 26, will ultimately set core III to the One state. Special emphasis should be placed on the fact that the output pulse which is positive at the dotted terminal of the B winding of core II is effective only in charging capacitor 33 between cores II and II and has substantially no effect upon capacitor 31 between cores I and II, due to the relative impedances involved. Thus, in the forward direction, the charging impedance is relatively low, whereas in the reverse direction, the impedance is relatively high due to resistor 32 between cores I and II.

Resultantly, with successive shift pulses, the data pulse One which was initially read in, serially advances from core to core until the $n^{th}$ and final core is set to the One state. The next following shift pulse, in resetting core $n$ to Zero, delivers an output pulse at terminals 47, and in the interval preceding the next following shift pulse, the energy stored in capacitor 43 following the $n^{th}$ core is dissipated in resistor 44 associated therewith. It should be apparent that delay network 42 is not an essential element, and that it may be dispensed with entirely without effect on the output signal. However, simply by removing the short circuit, the shift register may be extended by the addition of cores.

The progression of the data pulse just described is wholly independent of the introduction at terminals 46 of further data pulses in the interval between shift pulses. In other words, by sequentially applying binary digits at terminals 46 in the intervals between shift pulses, binary data may be entered into, stored and progressively shifted out of the shift register shown in Fig. 1.

The number of binary digits which may be stored and processed in the circuit of Fig. 1 is exactly equal to the number of cores serially arranged in the manner shown. There is no immediate limitation on this number except that as the number of cores is increased, the shift current power input at terminals 21, and its maximum potential must be increased appropriately. The key design criteria here are that maximum power is needed when all cores are in the One state and the shift pulse must reset all to the Zero state. However, there is no direct interrelationship between the shift pulse power requirement and the power required in the data signal as applied to terminals 46, simply because the data pulse need only set the first core.

Special emphasis should be placed upon the nature of the delay network required between each of the cores in the serial shift register shown. The R–C circuit shown is fully effective in most instances. However, it may be desirable to add series inductance for certain high frequency applications, and in fact, a lumped constant delay line may be substituted for the network shown. The relative merits of the possible alternatives have been, to a large extent, disclosed in literature bearing on earlier shift register types and need not be treated in any greater detail herein.

The design specifications of a typical circuit embodying the principles shown in Fig. 1 may be appropriately set forth at this point. This circuit was built around magnetic cores having an 0.3 inch inside diameter and formed of 5⅛ turns of Deltamax ribbon. Both A and B windings were formed with 67 turns and in each of the interstage networks, a Transitron T–1 germanium diode was used with a delay network having an 0.25 microfarad shunt capacitor and a 240 ohm series resistor. No difficulty at all was experienced in operation of this shift register at frequencies of 10 kilocycles per second and higher.

Figures 3, 4:
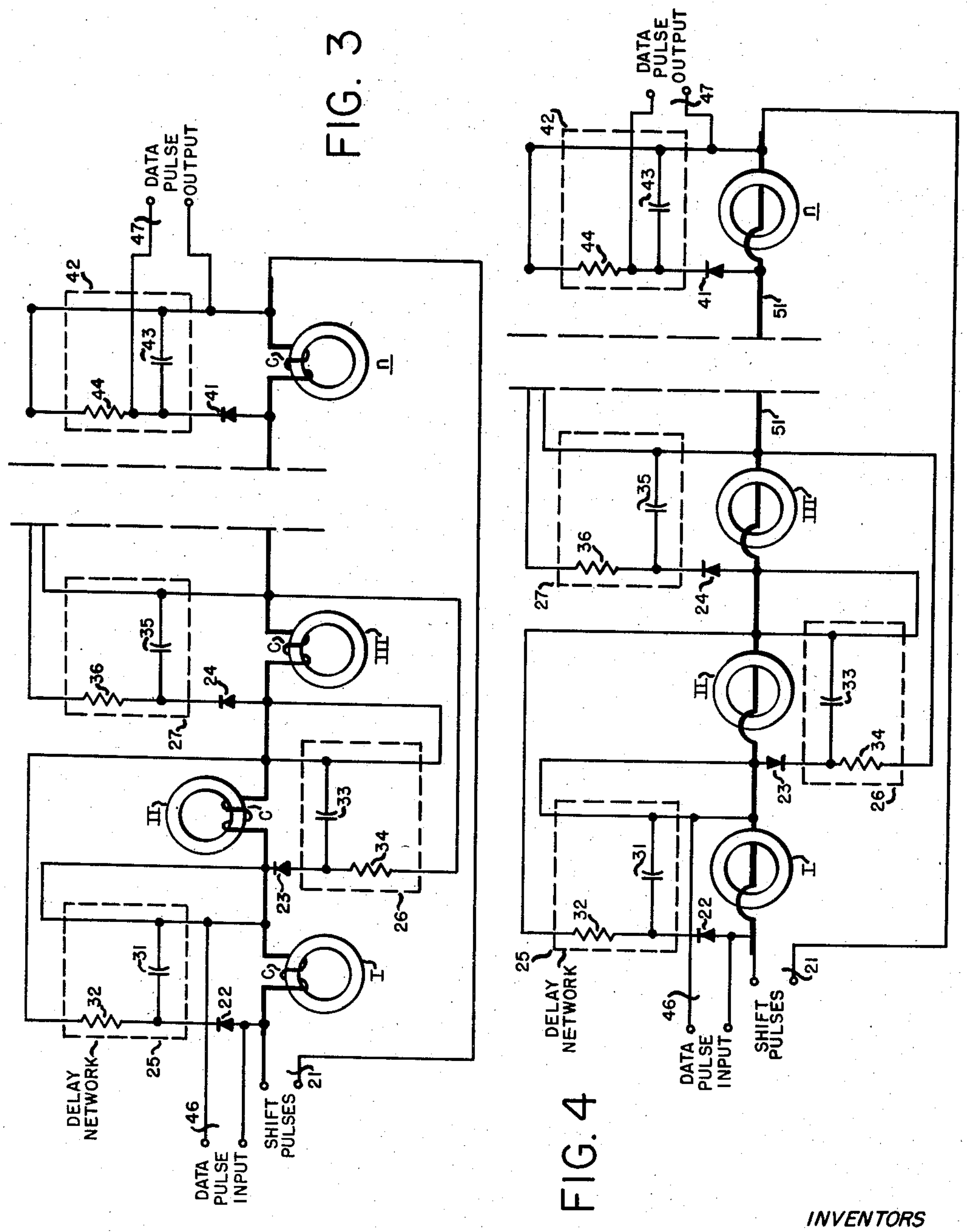
Fig. 3 is a schematic circuit diagram of another novel magnetic shift register.
Fig. 4 is a schematic circuit diagram of a shift register which, though fundamentally like that shown in Fig. 3, is illustrative of the unusual advantages which may be derived by application of the present inventive concepts.

With reference now to Fig. 3, there is illustrated a schematic circuit diagram of a novel serial shift register having $n$ cores, and utilizing one core per bit of binary information stored, with but a single winding C per core. In analogy to Fig. 1, the cores in Fig. 3 have been designated by the Roman numerals I, II, III, . . . $n$.

The windings C of the $n$ cores are connected in series to a source (not shown) of shift current pulses at terminals 21. With but a single winding per core, it is no longer necessary to specify relative winding direction, and the dot notation has thus been omitted. By definition, the flow of shift current in each winding C will read a Zero into the respective core, and, consequently, a flow of current in any winding opposite to the shift current direction will read a One into that core.

The winding C on each core is coupled to the winding of the next succeeding core through a diode and a delay network, as in Fig. 1, and in view of their full equivalence, the same reference numerals have been applied to these and other like circuit elements. Data pulses are applied directly from terminals 46 to winding C of core I and the serial data pulse output of the shift register is derived at terminals 47 across capacitor 43 associated with core $n$. Here, as in Fig. 1, the output of the last delay network in the system is short-circuited.

To describe the operation of the shift register shown in Fig. 3, let it be assumed that all cores are in the Zero state and that the direction of shift current during each shift pulse is from left to right in each winding C. If in the interval between shift pulses, a data pulse is applied at terminals 46 of such polarity as to cause current to flow through winding C of core I from right to left, that is, in the direction opposite to normal shift current flow, a One will be read into core I. Evidently, this pulse will be positive at the right hand end of winding C, with the result that diode 22 associated with core I precludes the flow of this data current into any of the succeeding magnetic cores.

In order to analyze the effect of the next shift register pulse upon the circuit shown in Fig. 3, it would be well to consider the relative core impedance during the pulse period. If a core is set in the Zero state and a Zero shift pulse applied thereto, the total flux change therein is negligible with the result that its self-inductance, and hence impedance, are both likewise negligible. However, if a core is in the One state when a Zero pulse is applied, a substantial reversal of flux occurs and, as a consequence, the self-inductance and impedance are both relatively high. With core I in the One state and all others in the Zero state, the application of the next following shift pulse will find all cores, with the exception of core I, as low impedances; therefore, the potentials appearing across windings C in all cores but the first will be without significance. The potential appearing across winding C of core I will be of considerable magnitude during the period that the core flux is reset to the Zero state. This potential which is positive at the left hand end of winding C will cause current to flow through diode 22 to charge capacitor 31 positively at the junction between the diode 22 and resistor 32. Immediately after this shift current pulse, capacitor 31 will discharge through resistor 32 and by virtue of the connections to winding C of core II, current will flow therethrough from right to left, and read a One into this core. Diode 23 associated with core II will preclude current flow into any of the cores serially following core II and diode 22 associated with core I will similarly prevent reverse current flow into winding C associated with core I. In summary, the effect of resetting core I to Zero is to set core II to One.

Succeeding shift current pulses applied at terminal 21 will advance this One from core to core until the $n^{th}$ and final core is reached, and in a manner similar to that already discussed in connection with Fig. 1, the relative forward and backward impedances will, at all times, preclude the flow of information in any but the forward direction. When the state of core $n$ is reset from One to Zero, a data pulse output will be derived at terminals 47 and the energy stored in capacitor 43 of the last delay network will ultimately be dissipated in resistor 44 thereof. As noted above for Fig. 1, delay network 42 is not an absolutely essential element.

In a typical embodiment of the circuit shown in Fig. 3, magnetic cores of 0.3 inch in inside diameter having 5⅛ turns of Deltamax ribbon were used with a single winding of 67 turns. The remaining components were all as noted earlier for typical performance with the circuit of Fig. 1. Once again, operating frequencies of 10 kilocycles per second and greater were readily achieved.

The simplification of shift register circuit designed in accordance with the concepts of the present invention is further emphasized by Fig. 4 which illustrates a shift register embodying precisely the electrical design shown in Fig. 3 with the exception that the multi-turn winding C associated with each of the toroidal cores has been replaced by a single turn in the form of conductor 51 threaded through the opening of each of the toroidal cores. All other circuit components bear the reference designations shown in Fig. 3.

The magnetization of a core to a particular state or the reversal thereof is a function of the number of ampere-turns. The use of a single conductor such as 51, of course, imposes the requirement that the shift current be of substantial value, but such currents are conveniently available with modern pulse generating equipment. Offsetting the relative disadvantage of the high current requirement is the fact that the voltage drop per core is exceedingly small and this facilitates the use of a large number of cores in series to increase system storage capacity.

With the novel circuit arrangement shown in Fig. 4, extremely compact and light-weight shift registers are possible. Those concerned with the development of the magnetic materials per se have recently evolved efficient bistable magnetic cores of the order of ⅛ inch in outside diameter and less. A shift register incorporating the principles disclosed in Fig. 4 will utilize magnetic components which, in fact, are the least expensive and smallest components of the overall circuit.

Certain factors should be mentioned at this point concerning the generality of various concepts disclosed above. Although a single data source has been shown for entering information to the first core in each embodiment, various other circuits are possible. If the system so requires, parallel inputs, one input connected to each core may be used. This will not alter the fundamental performance characteristics. It should be observed that there is no theoretical limit to the number of cores which may be used in series in any one shift register. The practical limitations which do exist are fundamentally the same as those encountered in the design of earlier shift register types. Further, although special emphasis has been placed upon shift register performance, certain of the features shown herein are applicable with equal force to related magnetic circuitry, such as magnetic counters, scalers and flip-flops.

In view of the fact, therefore, that numerous modifications and departures may now be made by those skilled in this electrical art, the invention herein is to be construed as limited only by the spirit and scope of the appended claims.

What is claimed is:

1. A magnetic shift register comprising, a plurality of serially arranged magnetic cores characterized by first and second residual magnetic flux states and each having first and second windings thereon, means serially connecting all of said first windings for the simultaneous application of shift current signals thereto, said shift current signals being effective to set each of said magnetic cores to said first stable residual flux state, unilaterally conductive signal delay networks for coupling each of said second windings to the corresponding winding of the next consecutive core, said delay networks being arranged whereby signals transferred therethrough from the second winding of one of said cores to the second winding of the next consecutive core are effective to set said last-mentioned core to said second stable residual flux state.

2. A magnetic shift register comprising, a plurality of serially arranged magnetic cores each characterized by a substantially rectangular magnetic hysteresis loop with first and second stable residual magnetic flux states and each having first and second windings thereon, means serially connecting all of said first windings for the simultaneous application of shift current pulses thereto, said shift current pulses being effective to set each of said magnetic cores to said first stable residual flux state, signal delay networks, each network being associated with one of said magnetic cores, each of said signal delay networks having input terminals coupled to the second winding of the associated core and output terminals coupled to the second winding of the next consecutive core, unilaterally conductive circuit control elements for controlling direction of current flow through each of said signal delay networks, each of said delay networks being arranged whereby signals transferred therethrough are effective to set the next consecutive core to said second stable residual flux state.

3. A magnetic shift register comprising, a plurality of serially arranged toroidal magnetic cores each characterized by a substantially rectangular magnetic hysteresis loop with first and second stable residual magnetic flux states and each having first and second magnetizing windings thereon, means serially connecting all of said first windings for the serial application of shift current pulses thereto, each of said shift current pulses being effective to set each of said magnetic cores to said first stable residual flux state, a signal delay network associated with each of said magnetic cores and arranged to couple said second winding of the associated magnetic core to said second winding of the next consecutive magnetic core, a rectifier element in circuit with each delay network for controlling the direction of current flow therethrough, each of said delay networks and associated rectifier elements being arranged whereby signals transferred through a delay network flow through said second winding of said next consecutive core only in a direction effective to set said second stable residual flux state therein, signals for transfer through said delay networks being generated when a shift current pulse effectively resets the associated core from said second stable state to said first stable state, means for applying data pulse currents to said second winding of the first of said serially arranged magnetic cores during an interval between said shift current pulses effective to set said first core to said second stable state, and means for deriving output signals from the second winding of at least one of the remaining serially arranged magnetic cores.

4. A magnetic shift register comprising, a plurality of serially arranged toroidal magnetic cores each characterized by a substantially rectangular magnetic hysteresis loop with first and second stable residual magnetic flux states and each having first and second magnetizing windings thereon, means serially connecting all of said first windings for the serial application of shift current pulses thereto, each of said shift current pulses being effective to set each of said magnetic cores to said first stable residual flux state, a signal delay network associated with each of said magnetic cores and arranged to couple said second winding of the associated magnetic core to said second winding of the next consecutive magnetic core, a rectifier element in circuit with each delay network for controlling the direction of current flow therethrough, each of said delay networks and associated rectifier elements being arranged whereby signals transferred through a delay network flow through said second winding of said next consecutive core only in a direction effective to set said second stable residual flux state therein, signals for transfer through said delay networks being generated when a shift current pulse effectively resets the associated core from said second stable state to said first stable state, means for applying data pulse currents to said second winding of the first of said serially arranged magnetic cores during an interval between said shift current pulses effective to set said first core to said second stable state, and means for deriving output signals from said second winding on the last of said serially arranged magnetic cores.

5. A magnetic shift register comprising, first and second toroidal bistable magnetic cores each having first and second windings thereon, means connecting said first windings of said first and second cores in series for the serial application of shift current pulses thereto, means coupling said second winding on said first core to said second winding on said second core including a rectifier and signal delay network in series, said rectifier being poled for the transmission of signals generated in said second winding on said first magnetic core when one of said shift current pulses reverses the stable magnetic state thereof, said coupling means being arranged whereby signals transferred through said rectifier and delay network flow through said second winding on said second core in a direction effective to set said second magnetic core to the stable state opposite that set by one of said shift current pulses flowing through said first winding on said second magnetic core.

6. A magnetic shift register comprising, first and second toroidal bistable magnetic cores each having first and second windings thereon, means connecting said first windings of said first and second cores in series for the serial application of shift current pulses thereto, means including a signal delay network and a rectifier element for unilaterally coupling said second winding on said first core to said second winding on said second core, means for directly applying data pulse signals to said second winding on said first core and means for deriving an output signal from said second winding on said second core.

7. A magnetic shift register comprising, first and second toroidal magnetic cores each characterized by a substantially rectangular magnetic hysteresis loop with first and second stable residual magnetic flux states and each having first and second windings thereon, means connecting said first windings of said first and second cores in series for the serial application of unidirectional shift current pulses thereto, each of said shift pulses being effective through said first windings for setting said first and second cores to said first stable state, a signal delay network having input and output terminals, means coupling said input terminals to said second winding on said first core, means coupling said output terminals to said second winding of said second core, a unilaterally conductive circuit element for controlling the direction of current flow through said signal delay network, said signal delay network and said unilaterally conductive element being arranged whereby upon the application of one of said shift current pulses effectively setting said first magnetic core to said first stable state from said second stable state, current flows through said signal delay network and said second winding of said second core in a direction effective to set said second core to said second stable state, means for applying data current pulses directly to said second winding of said first magnetic core in intervals between selected shift pulses, each of said data current pulses being effective to set said first core to said second stable state, and means for deriving an output signal from said second winding of said second magnetic core upon the application of a shift current pulse to said first winding of said second core effective to reset said second core to said first stable state from said second stable state.

8. Apparatus as in claim 7 wherein said signal delay network and said unilaterally conductive circuit element are further arranged whereby the magnetic state of said second core remains unaffected during the application of a data current pulse to said first magnetic core, and whereby the magnetic state of said first core remains unaffected by an output signal as aforesaid from said second core.

9. In a magnetic core shift register, a bistable toroidal magnetic core having first and second windings for controlling the magnetic flux state thereof, means for directing unidirectional shift current pulses through said first winding, means for directing data signal current pulses through said second winding, a unilaterally conductive output circuit connected in parallel with said second winding and arranged to yield a delayed output signal whenever a shift current pulse reverses the flux state of said magnetic core, and further arranged to preclude an output signal during the flow of a data current pulse through said second winding.

References Cited in the file of this patent

UNITED STATES PATENTS

| | | |
|---|---|---|
| 2,652,501 | Wilson | Sept. 15, 1953 |
| 2,654,080 | Browne | Sept. 29, 1953 |

OTHER REFERENCES

Publication, IRE National Convention Record, Part 7, March 23–26, 1953, pp. 38–42.